United States Patent Office.

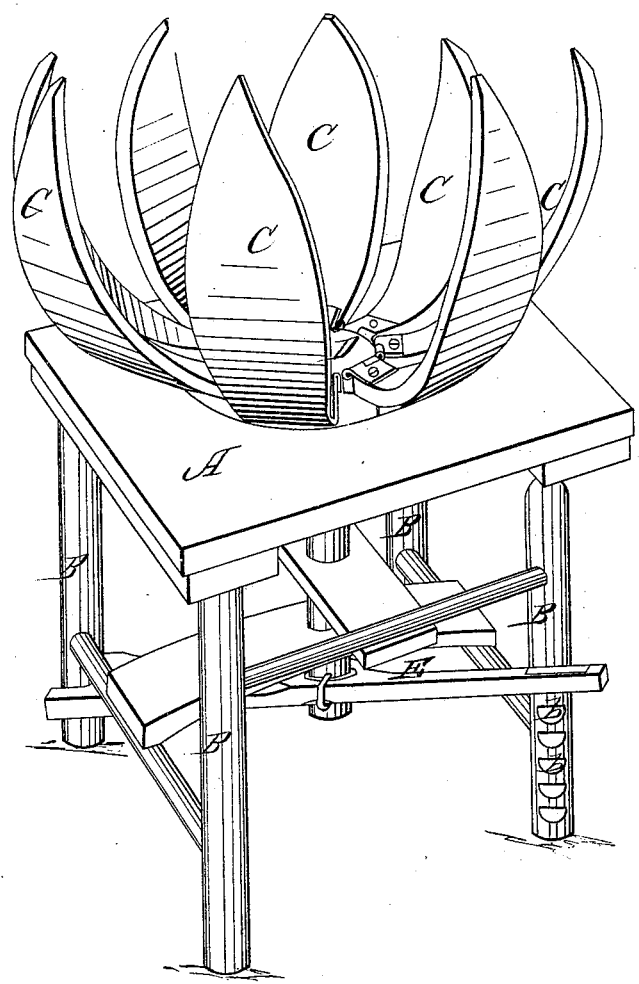

SOLON COOLEY, OF CARO, MICHIGAN, ASSIGNOR TO HIMSELF AND CEYLON M. KELLY, OF SAME PLACE.

Letters Patent No. 96,779, dated November 16, 1869.

IMPROVED APPARATUS FOR TYING FLEECES.

The Schedule referred to in these Letters Patent and making part of the same

*To whom it may concern:*

Be it known that I, SOLON COOLEY, of Caro, in the county of Tuscola, and State of Michigan, have invented a new and useful Improvement in Apparatus for Tying Fleeces; and I do declare that the following is a true and accurate description thereof, reference being had to the accompanying drawings, and to the letters of reference marked thereon, and being a part of this specification.

The nature of this invention relates to an improvement in the construction of an apparatus for holding and compressing fleeces of wool while they are being tied up.

It consists in the peculiar arrangement of its several parts, which are a series of curved leaves or fingers, hinged to and around a circular stem, projecting through a circular opening in a table, and operated by a treadle-lever, in such a manner that a fleece, placed within the leaves, may be pressed to a compact sphere while being tied.

In the drawings—

A represents a proper table, having a circular opening in its centre.

The table is supported by legs B.

C are curved leaves, in the form of sections of a hollow sphere, their lower ends hinged to and around the head of a circular stem, D, the lower end of which is pivoted in the treadle-lever E.

This lever is pivoted at its rear end to one of the rear legs of the table, and extends diagonally across it, its front end engaging with notches $b$, cut in the opposite front leg.

To operate this apparatus, raise the treadle, when the leaves C will fall apart and open out, then lay two pieces of twine, of the proper length, across each other, and between the open leaves, then lay the fleece in the leaves and depress the treadle; as the leaves are drawn down through the circular opening in the table, they are compelled to close up in the form of a sphere, compressing the fleece into a compact mass.

When the fleece is sufficiently compressed, the outer end of the treadle is caused to engage with one of the notches $b$, when the pressure will be maintained. The strings are then separately drawn over the top of the fleece, and securely tied, when the fleece may be removed, ready for shipment.

I am aware that Letters Patent issued to Lewis Tupper, February 8, 1848, for "tying fleeces," and do not claim the devices of said Tupper; but

What I claim as my invention, and desire to secure by Letters Patent, is—

The arrangement of the hinged leaves C, the stem D, the table A, with a suitable opening for the stem D, the treadle-lever E, and the notches $b$, in one of the standards B, when constructed, combined, and operating as and for the purpose specified.

SOLON COOLEY.

Witnesses:
JAS. I. DAY,
H. F. EBERTS.